United States Patent [19]

Hara et al.

[11] Patent Number: 5,229,476

[45] Date of Patent: * Jul. 20, 1993

[54] METHOD FOR PRODUCING A STEREOSPECIFIC POLYOLEFIN

[75] Inventors: Daiji Hara, Yokkaichi; Mitsuhiro Mori, Aichi; Yozo Kondo, Yokkaichi, all of Japan

[73] Assignee: Tosoh Corporation, Shinnanyo, Japan

[ * ] Notice: The portion of the term of this patent subsequent to Jul. 6, 2010 has been disclaimed.

[21] Appl. No.: 749,132

[22] Filed: Aug. 23, 1991

[30] Foreign Application Priority Data

Sep. 4, 1990 [JP] Japan ................... 2-232565

[51] Int. Cl.$^5$ .................. C08F 4/651; C08F 4/654; C08F 10/06
[52] U.S. Cl. .................................. 526/119; 502/119; 502/125; 526/128; 526/132; 526/133; 526/155; 526/903; 526/904
[58] Field of Search ............. 526/119, 128, 132, 133, 526/155

[56] References Cited

U.S. PATENT DOCUMENTS

| | | | |
|---|---|---|---|
| 4,130,699 | 12/1978 | Hoff et al. ................ | 526/125 |
| 4,405,769 | 9/1983 | Capshew et al. ........... | 526/125 |
| 4,463,145 | 7/1984 | Sunada et al. ............ | 526/142 |
| 4,478,951 | 10/1984 | Huff ...................... | 526/144 |
| 4,543,400 | 9/1985 | Wristers ................. | 526/140 |
| 4,579,836 | 4/1986 | Arzouanidis et al. ...... | 526/904 |

FOREIGN PATENT DOCUMENTS

| | | |
|---|---|---|
| 0230707 | 5/1987 | European Pat. Off. . |
| 0244678 | 11/1987 | European Pat. Off. . |
| 275317 | 7/1988 | European Pat. Off. . |
| 0368344 | 5/1990 | European Pat. Off. . |
| 0376084 | 7/1990 | European Pat. Off. . |
| 0376145 | 7/1990 | European Pat. Off. . |

*Primary Examiner*—Edward J. Smith
*Attorney, Agent, or Firm*—Oblon, Spivak, McClelland, Maier & Neustadt

[57] ABSTRACT

A method for producing a stereospecific polyolefin in the presence of a catalyst comprising a transition metal compound and an organometallic compound, wherein a catalyst system is used which comprises: (A) a solid catalyst component prepared by reacting a homogeneous solution containing (i-1) magnesium and a hydroxylated organic compound, (i-2) an oxygen-containing organic compound of titanium and/or (i-3) an oxygen-containing organic compound of silicon and an oxygen-containing organic compound of aluminum and/or a boron compound, with (ii) at least one aluminum halide compound to obtain a solid product, and further reacting to this solid product (iii) an electron-donative compound, (iv) a titanium halide compound, and (v) ethylene and/or an α-olefin having at least 3 carbon atoms, (B) at least one member selected from the group consisting of organometallic compounds of Groups IA, IIA, IIB, IIIB and IVB of the Periodic Table, and (C) an electron-donative compound. A highly stereospecific polymer having good configuration of particles can be obtained in good yield by the method of the present invention.

13 Claims, No Drawings

METHOD FOR PRODUCING A STEREOSPECIFIC POLYOLEFIN

This invention relates to a method for producing a stereospecific polyolefin. More particularly, this invention relates to a method which is capable of producing a highly stereospecific polymer having a good configuration of particles in good yield by using a specific catalyst in the (co)polymerization of an α-olefin having at least three carbon atoms.

Heretofore, as a catalyst for polymerization of olefins, α-type titanium trichloride obtained by reducing titanium tetrachloride with hydrogen, purple γ-type titanium trichloride obtained by reducing titanium tetrachloride with aluminum or δ-type titanium trichloride obtained by pulverizing such titanium trichloride by a ball mil, has been known. Further, as a method for modifying such catalysts, it is known to subject them to mixing and pulverizing treatment together with various modifying agents. However, when such catalysts were used for polymerization, the polymerization activities were low, and the catalyst residues in the resulting polymers were substantial, whereby a so-called deashing step was necessary. Further, in recent years, many proposals have been made for the production of a solid catalyst component composed essentially of magnesium, titanium and halogen. However, in many of them, further improvements are desired with respect to the catalytic activities or the stereospecificity, powder properties, etc of the polymers.

The present inventors have previously proposed methods for obtaining stereospecific polyolefins in good yield by means of certain specific solid catalyst components comprising magnesium, titanium and halogen as the main components in Japanese Unexamined Patent Publications No. 3007/1988, No. 314210/1988, No. 317502/1988 and No. 105/1989. In these methods, however, a large amount of a titanium halide compound was required.

It is an object of the present invention to overcome such a disadvantage of the conventional methods and to provide a method whereby the amount of a titanium halide compound to be used can be reduced.

As a result of extensive researches, the present invention has been accomplished by using in the method described in e.g. the above-mentioned Japanese Unexamined Patent Publication No. 3007/1988, a solid catalyst prepared by reacting an electron-donative compound, a titanium halide compound and ethylene and/or an α-olefin having at least 3 carbon atoms to a solid product obtained by reacting at least one aluminum halide to a homogeneous solution comprising Mg, Ti or a Si, and as co-catalysts, an organometallic compound and an electron-donative compound.

Thus, the present invention provides a method for producing a stereospecific polyolefin in the presence of a catalyst comprising a transition metal compound and an organometallic compound, wherein a catalyst system is used which comprises:

(A) a solid catalyst component prepared by reacting a homogeneous solution containing (i-1) magnesium and a hydroxylated organic compound, (i-2) an oxygen-containing organic compound of titanium and/or (i-3) an oxygen-containing organic compound of silicon and an oxygen-containing organic compound of aluminum and/or a boron compound, with (ii) at least one aluminum halide compound to obtain a solid product, and further reacting to this solid product (iii) an electron-donative compound, (iv) a titanium halide compound, and (v) ethylene and/or an α-olefin having at least 3 carbon atoms, (B) at least one member selected from the group consisting of organometallic compounds of Groups IA, IIA, IIB, IIIB and IVB of the Periodic Table, and (C) an electron-donative compound.

Now, the present invention will be described in detail with reference to the preferred embodiments.

The solid catalyst component (A) to be used in the present invention, can be prepared by reacting a homogeneous solution containing (i-1) magnesium and a hydroxylated organic compound, (i-2) an oxygen-containing organic compound of titanium and/or (i-3) an oxygen-containing organic compound of silicon and an oxygen-containing organic compound of aluminum and/or a boron compound, with (ii) at least one aluminum halide compound to obtain a solid product, and further reacting to this solid product (iii) an electron-donative compound, (iv) a titanium halide compound, and (v) ethylene and/or an α-olefin having at least 3 carbon atoms.

The method for preparing the homogeneous solution for the above component (i) has been proposed and described in detail by the present inventors in e.g. Japanese Unexamined Patent Publication No. 105/1989.

A homogeneous solution containing magnesium, a hydroxylated organic compound and titanium may be prepared, for example, by reacting metal magnesium, a hydroxylated organic compound and an oxygen-containing organic compound of titanium such as a titanium alkoxide. In such a case, metal magnesium and a hydroxylated organic compound may preliminarily be reacted before use.

Metal magnesium can take any form such as powdery form, granular form, foil form, and ribbon form, and as the hydroxylated organic compound, alcohols, phenols and organosilanols are suitable.

As the alcohols, linear or branched aliphatic alcohols having 1 to 18 carbon atoms or alicyclic or aromatic alcohols can be used. Specific examples include methanol, ethanol, n-propanol, i-propanol, n-butanol, n-hexanol, 2-ethylhexanol, n-octanol, i-octanol, n-stearyl alcohol, cyclopentanol, cyclohexanol, and ethylene glycol. Further, the phenols include, for example, phenol, cresol, xylenol and hydroquinone.

The organosilanols are those having at least one hydroxyl group and an organic group selected from an alkyl group with 1 to 12, preferably 1 to 6, carbon atoms, a cycloalkyl group, an arylalkyl group, an aryl group, and an alkylaryl group. For example, trimethylsilanol, triethylsilanol, triphenylsilanol, and t-butyldimethylsilanol may be mentioned.

These hydroxylated organic compounds can be used alone or as a mixture of two or more of them.

In addition, when metal magnesium is used to prepare a solid catalyst component (A) of the present invention, for the purpose of accelerating the reaction, it is preferable to add one or more substances that will react with metal magnesium or form an adduct, e.g. polar substances such as iodine, mercuric chloride, halogenated alkyls, and organic acids.

As the oxygen-containing organic compound of titanium for the above-mentioned reactant (i-2), a compound of the formula $[O_pTi_u(OR^1)_q]_n$ is used. In this formula $R^1$ is a hydrocarbon group having from 1 to 20 carbon atoms, preferably from 1 to 10 carbon atoms. As such a hydrocarbon group, a linear or branched alkyl group, a cycloalkyl group, an arylalkyl group, an aryl group and an alkylaryl group may be mentioned. In the formula, p, q and u are numbers satisfying $p \geq 0$, $q > 0$, $u \geq 1$ and agreeable with the valence of Ti, and n is an integer. X is a halogen atom. It is particularly preferred to use an oxygen-containing organic compound of titanium wherein $o \leq p \leq 1$, $1 \leq u \leq 2$ and $1 \leq n \leq 6$.

Specific examples include titanium tetraethoxide, titanium tetra-n-propoxide, titanium tetra-i-propoxide, titanium tetra-n-butoxide and hexa-i-propoxy dititanate. Use of several oxygen-containing organic compounds of titanium having different hydrocarbon groups is included in the scope of the present invention. These oxygen-containing organic compounds of titanium may be used alone or may be used by mixing or reacting two or more of them.

A homogeneous solution containing magnesium, a hydroxylated organic compound, oxygen-containing organic compounds of silicon and aluminum, and/or a boron compound, may be prepared, for example, by using an oxygen-containing organic compound of silicon and an oxygen-containing organic compound of aluminum and/or a boron compound, instead of the oxygen-containing organic compound of titanium such as a titanium alkoxide.

As the oxygen-containing organic compound of aluminum for the above-mentioned reactant (i-3), an oxygen-containing organic compound of the formula $Al(OR^2)_mX_{3-m}$ is used. In the formula, $R^2$ is a hydrocarbon group having from 1 to 20 carbon atoms, preferably from 1 to 10 carbon atoms. As such a hydrocarbon group, a linear or branched alkyl group, a cycloalkyl group, an arylalkyl group, an aryl group and an alkylaryl group, may be mentioned. In the formula, m is a number of $0 < m \leq 3$, and X is a halogen atom.

Specific examples of the oxygen-containing organic compound of aluminum, include trimethoxy aluminum, triethoxy aluminum, tri-n-propoxy aluminum, tri-i-propoxy aluminum, tri-n-butoxy aluminum, tri-sec-butoxy aluminum, tri-tert-butoxy aluminum, tri(2-ethylhexoxy)aluminum, triphenoxy aluminum, tribenzyloxy aluminum, dichloromethoxy aluminum, chlorodimethoxy aluminum, dichloro(2-ethylhexoxy) aluminum, chlorodi(2-ethylhexoxy) aluminum, dichlorophenoxy aluminum and chlorodiphenoxy aluminum. Use of several oxygen-containing organic compounds of aluminum having different hydrocarbon groups is also included in the scope of the present invention. These oxygen-containing organic compounds of aluminum may be used alone or in combination as a mixture of two or more of them.

As the boron compound for the above-mentioned reactant (i-3), a boron compound of the formula $R^3{}_aB(OR^4)_bX_{3-(a+b)}$ is used. In the formula, each of $R^3$ and $R^4$ is a hydrocarbon group having from 1 to 20, preferably from 1 to 10, carbon atoms such as a linear or branched alkyl group, a cycloalkyl group, an arylalkyl group, an aryl group or an alkylaryl group, a halogenated hydrocarbon group, an amino group-substituted hydrocarbon group, or a hydrogen atom, m and n are numbers satisfying $0 \leq a \leq 3$, $0 \leq b \leq 3$ and $0 \leq a+b \leq 3$, and X is a halogen atom.

Specific examples of the boron compound include trimethoxyborane, triethoxyborane, tri-n-propoxyborane, tri-i-propoxyborane, tri-n-butoxyborane, tri-i-butoxyborane, tri-sec-butoxyborane, tri-tertbutoxyborane, tri(2-ethylhexoxy)borane, triphenoxyborane, tribenzyloxyborane, di-i-propoxymethylborane, di-i-propoxyphenylborane, 2-aminoethyldiphenylborane, trimethylene borate (an ester of 1-3-propanediol with boric acid), butyl borate, triethylborane, tri-n-butylborane, tri-i-butylborane, tri-sec-butylborane, tri-sec-isoamylborane, triphenylborane, trimesitylborane, tris(4-fluorophenyl)borane, B-isopinocamphenyl-9-borabicyclo(3,3,1)nonane, 9-borabicyclo(3,3,1)nonane, di-sec-isoamylborane, chlorodiethoxyborane, dichloroethoxyborane, bromodiethylborane, trichloroborane and tribromoborane. Use of boron compounds having different substituents is also included in the scope of the present invention. These boron compounds may be used alone or in combination as a mixture of two or more of them.

As the oxygen-containing organic compounds of silicon for the above-mentioned reactant (i-3), oxygen-containing organic compounds of silicon of the formula $R^5{}_sSi(OR^6)_tX_{4-(s+t)}$ may be used. In the formula, each of $R^5$ and $R^6$ is a hydrocarbon group having from 1 to 20, preferably from 1 to 10, carbon atoms, such as a linear or branched alkyl group, a cycloalkyl group, an arylalkyl group, an aryl group or an alkylaryl group, or a hydrogen atom, s and t represent numbers satisfying $0 \leq s \leq 3$, $1 \leq t \leq 4$ and $1 \leq s+t \leq 4$, and X is a halogen atom.

As specific examples, there may be mentioned alkoxysilanes or aryloxysilanes, such as tetramethoxysilane, tetraethoxysilane, tetra-n-propoxysilane, tetra-i-propoxysilane, tetra-n-butoxysilane, tetra-i-pentoxysilane, tetra-n-hexoxysilane, tetraphenoxysilane, tetrakis(2ethylhexoxy)silane, tetrakis(2-ethylbutoxy)silane, tetrakis(2-methoxyethoxy)silane, methyltrimethoxysilane, ethyltrimethoxysilane, n-butyltrimethoxysilane, phenyltrimethoxysilane, vinyltrimethoxysilane, chloromethyltrimethoxysilane, 3-chloropropyltrimethoxysilane, 4-chlorophenyltrimethoxysilane, trimethoxysilane, methyltriethoxysilane, ethyltriethoxysilane, n-propyltriethoxysilane, n-butyltriethoxysilane, phenyltriethoxysilane, vinyltriethoxysilane, 3-aminopropyltriethoxysilane, triethoxysilane, ethyltri-i-propoxysilane, vinyltri-i-propoxysilane, i-pentyltri-n-butoxysilane, methyltri-i-pentoxysilane, ethyltri-i-pentoxysilane, methyltri-n-hexoxysilane, phenyltri-i-pentoxysilane, n-propyltrimethoxysilane, i-propyltrimethoxysilane, i-butyltrimethoxysilane, dimethyldimethoxysilane, methylphenyldimethoxysilane, diphenyldimethoxysilane, methyldimethoxysilane, dimethyldiethoxysilane, diethyldiethoxysilane, diphenyldiethoxysilane, methyldodecyldiethoxysilane, methyloctadecyldiethoxysilane, methylphenyldiethoxysilane, methyldiethoxysilane, dibenzyldiethoxysilane, diethoxysilane, dimethyldi-n-butoxysilane, dimethyldi-i-pentoxysilane, diethyldi-i-pentoxysilane, di-i-butyldi-i-pentoxysilane, diphenyldi-i-pentoxysilane, diphenyldi-n-octoxysilane, diisobutyldimethoxysilane, trimethylmethoxysilane, trimethylethoxysilane, dimethylethoxysilane, trimethyl-i-propoxysilane, trimethyl-n-propoxysilane, trimethyl-t-butoxysilane, trimethyl-i- butoxysilane, trimethyl-n-butoxysilane, trimethyl-n-pentoxysilane and trimethylphenoxysilane, or haloalkoxysilanes or haloaryloxysilanes such as dichlorodiethoxysilane, dichlorodiphenoxysilane and tribromoethoxysilane. Such oxygen-containing organic compounds of silicon may be used alone or two or more of them may be mixed or reacted for use.

As the aluminum halide compound for the abovementioned reactant (ii), those represented by the general formula $AlR^7{}_rX_{3-r}$ may be used. In the formula, $R^1$ represents a hydrocarbon group having from 1 to 20 carbon atoms, X represents a halogen atom, and r is a number of $0 < r \leq 2$. It is preferable that $R^7$ is selected from a linear or branched alkyl group, an alkoxy group, a cycloalkyl group, an arylalkyl group, an aryl group and an alkylaryl group.

The above aluminum halide compounds may be used alone or as a mixture of two or more of them.

Specific examples of the aluminum halide compound include, for example, ethylaluminum dichloride, n-propylaluminum dichloride, n-butylaluminum dichloride, i-butylaluminum dichloride, ethylaluminum sesquichloride, i-butylaluminum sesquichloride, i-propylaluminum sesquichloride, n-propylaluminum sesquichloride, diethylaluminum chloride, di-i-propylaluminum chloride, di-n-propylaluminum chloride, di-i-butylaluminum chloride, diethylaluminum bromide, and diethylaluminum iodide.

As the electron-donative compound for the abovementioned reactant (iii), ethers, esters, ketones, phenols, amines, amides, imines, nitriles, phosphines, phosphites, stibines, arsines, phosphoryl amides and alcoholates may be mentioned.

Among them, esters are preferred, and organic esters are most preferred.

As the organic esters, mono or diester of an aromatic carboxylic acid, mono or diester of an aliphatic carboxylic acid and the like may be mentioned.

Specific examples include, for example, butyl formate, ethyl acetate, butyl acetate, isobutyl isobutyrate, propyl pivalate, isobutyl pivalate, ethyl acrylate, methyl methacrylate, ethyl methacrylate, isobutyl methacrylate, diethyl malonate, diisobutyl malonate, diethyl succinate, dibutyl succinate, diisobutyl succinate, diethyl glutarate, dibutyl glutarate, diisobutyl glutarate, diisobutyl adipate, dibutyl sebacate, diethyl maleate, dibutyl maleate, diisobutyl maleate, monomethyl fumarate, diethyl fumarate, diisobutyl fumarate, diethyl tartarate, dibutyl tartarate, diisobutyl tartarate, methyl benzoate, ethyl benzoate, methyl p-toluate, ethyl p-toluate, ethyl p-tert butylbenzoate, ethyl p-anisate, isobutyl α-naphthoate, ethyl cinnamate, monomethyl phthalate, dibutyl phthalate, diisobutyl phthalate, dihexyl phthalate, dioctyl phthalate, di-2-ethylhexyl phthalate, diallyl phthalate, diphenyl phthalate, diethyl isophthalate, diisobutyl isophthalate, diethyl terephthalate, dibutyl terephthalate, diethyl naphthalate and dibutyl naphthalate. Such electron-donative compounds (iii) may be used alone or in combination as a mixture of two or more of them.

As the titanium halide compound for the abovementioned reactant (iv), compounds represented by the general formula $Ti(OR^8)_fX_{4-f}$ may be used. In the formula, $R^2$ represents a hydrocarbon group having 1 to 20 Carbon atoms, x is a halogen atom and f is a number of $0 \leq f < 4$. $R^8$ is preferably selected from a linear or branched alkyl group, an alkoxy group, a cycloalkyl group, an arylalkyl group, an aryl group and an alkylaryl group. The abovementioned titanium halide compounds may be used alone or in combination as a mixture of two or more of them.

Specific examples of the titanium halide compound include, for example, titanium tetrachloride, ethoxy titanium trichloride, propoxy titanium trichloride, butoxy titanium trichloride, phenoxy titanium trichloride, diethoxy titanium dichloride and triethoxy titanium chloride.

The ethylene and/or the α-olefin having at least 3 carbon atoms for the above reactant (v) is represented by the formula $R—CH=CH_2$ wherein R is a linear or branched or cyclic, substituted or unsubstituted alkyl group having from 1 to 10, particularly from 1 to 8, carbon atoms, or hydrogen. Specific examples of the α-olefin having at least 3 carbon atoms include propylene, 1-butene, 1-pentene, 4-methyl-1-pentene, 1-octene, vinyl cyclohexane and 3-methyl-1-butene.

The solid catalyst component (A) obtainable by the present invention, can be prepared by thoroughly washing a solid product obtained by reacting the above reactants (i) and (ii), and then reacting thereto the reactants (iii), (iv) and (v).

These reactions are preferably conducted in a liquid medium. For this purpose, especially when these reactants are not liquid under the operational conditions or the amount of liquid reactants is inadequate, these reactions should be conducted in the presence of an inert organic solvent.

As such an inert organic solvent, any solvent commonly used in this technical field may be employed, and aliphatic, alicyclic or aromatic hydrocarbons or halogenated derivatives or mixtures thereof may be employed. For examples, isobutane, pentane, isopentane, hexane, heptane, cyclohexane, benzene, toluene, xylene, chlorobenzene, 1,2-dichlorobenzene, 1,3-dichlorobenzene, benzyl chloride, methylene dichloride, 1,2-dichloroethane, 1,3-dichloropropane, 1,4-dichlorobutane, 1,1,1-trichloroethane, 1,1,2-trichloroethane, 1,1,1,2-tetrachloroethane, 1,1,2,2-tetrachloroethane, tetrachloroethylene, carbon tetrachloride or chloroform may be mentioned. These organic solvents may be used alone or in combination as a mixture. When a halogen derivative or a mixture of halogen derivatives is used, good results may sometimes be obtainable with respect to the polymerization activities and the stereospecificity of the polymer.

There is no particular restriction as to the amounts of the reactants (i), (ii), (iii), (iv) and (v) to be used in the present invention. However, it is preferred to select the amounts of the reactants so that the ratio of the magnesium atom in the reactant (i) to the aluminum atom in the aluminum halide (ii) will be within a range of from 1:0.1 to 1:100, preferably from 1:0.1 to 1:20. If the ratio of the aluminum atom increases beyond this range, the catalytic activities tend to be low, or it tends to be difficult to obtain good powder properties. On the other hand, if it is too small, it may sometimes be difficult to obtain good powder properties.

It is preferred to select the amounts so that the molar ratio of the magnesium atom in the reactant (i) to the electron-donative compound (iii) will be from 1:0.05 to 1:5.0, preferably from 1:0.1 to 1:2.0. If the molar ratio is outside this range, a problem may arise such that the polymerization activities tend to be low, or the stereospecificity of the polymer tends to be low.

Further, it is preferred to select the amount of the reactant (iv) so that the molar ratio of the magnesium atom in the reactant (i) to the titanium halide compound (iv) will be within a range of from 1:1 to 1:100, preferably from 1:3 to 1:50. If the ratio is outside this range, a problem may arise such that the polymerization activities tend to be low, or the products tend to be colored.

It is preferred to employ the amount of the reactant (v) so that the molar ratio of the magnesium atom in the reactant (i) to the ethylene and/or the α-olefin having at least 3 carbon atoms (v) (in a case where two or more olefins are used, the total amount of such olefins), will be within a range of from 1:0.01 to 1:10, preferably from 1:0.1 to 1:5. If the molar ratio is outside this range, a problem may arise such that no effects will be obtained, or the powder properties of the polymer particles will be poor. With respect to the reaction conditions at the time of obtaining the homogeneous solution (i), the reaction is conducted usually at a temperature within a range of from $-50°$ to $300°$ C., preferably from $0°$ to $200°$ C. for from 0.5 to 50 hours, preferably from 1 to 6 hours, in an inert gas atmosphere under atmospheric pressure or under an elevated pressure. In such case, it is possible to conduct the homogenizing in a short period of time by adding electron-donative compounds similar to the above compound (iii) and/or substances capable of reacting metal magnesium or capable of forming addition compounds, for example, iodine, mercuric chloride, an alkyl halide and polar substances such as organic acids, alone or in combination as a mixture of two or more of them.

Further, the reaction with the reactant (ii) is conducted usually at a temperature within a range of from $-50°$ to $200°$ C., preferably from $-30°$ to $150°$ C. for from 0.2 to 50 hours, preferably from 0.5 to 10 hours in an inert gas atmosphere under atmospheric pressure or under an elevated pressure. The reaction conditions with the reactant (ii) are very important, since they give a decisive role for the control of the particle configurations and the particle sizes of the resulting solid product particles, solid catalyst component particles and the polymer particles obtained by using the solid catalyst.

Further, the reaction with the reactant (iv) may be conducted in a divided fashion in multistages.

When the reaction with the reactant (iv) is divided in multistages, ethylene and/or an α-olefin is preferably supplied continuously at the time of the reaction with the reactant (iv) or all at once at the beginning of the reaction. In such cases, it is often possible to obtain an effect such as an improvement in the polymerization activities or in the stereospecificity of the polymer.

The solid catalyst component (A) thus obtained, may be used as it is. However, it is common to remove the remaining unreacted substances and by-products by filtration or decantation, then thoroughly wash it with an inert organic solvent and suspend it in an inert organic solvent for use. It is also possible to use the one which is isolated after washing and then heated under atmospheric pressure or under reduced pressure to remove the inert organic solvent. Further, prior to the main polymerization, a small amount of an organometallic compound component may be added and it is polymerized with a small amount of an α-olefin and/or ethylene of the formula $R-CH=CH_2$ wherein R is a linear or branched or cyclic, substituted or unsubstituted alkyl group having from 1 to 10, particularly from 1 to 8, carbon atoms, or a hydrogen atom, so that it can be used in a preliminarily polymerized form.

The solid catalyst component for component (A) thus obtained is used for the polymerization of an olefin in combination with the organometallic compound for component (B) and the electron-donative compound for component (C).

As the organometallic compound for component (B), an organometallic compound composed of a metal such as lithium, magnesium, zinc, tin or aluminum and an organic group, may be mentioned. As the organic group, an alkyl group may be mentioned as a representative. As such an alkyl group, a linear or branched alkyl group having from 1 to 20 carbon atoms, may be employed.

Specifically, n-butyl lithium, diethyl magnesium, diethyl zinc, trimethyl aluminum, triethyl aluminum, tri-i-butyl aluminum, tri-n-butyl aluminum, tri-n-decyl aluminum, tetraethyl tin or tetrabutyl tin, may, for example, be mentioned. It is particularly preferred to use a trialkyl aluminum of the formula $AlR^9_3$. In the formula, $R^9$ is a linear or branched alkyl group having from 1 to 10 carbon atoms. Further, an alkyl metal halide having an alkyl group of from 1 to 20 carbon atoms, such as ethyl aluminum sesquichloride, diethyl aluminum chloride, diisobutyl aluminum chloride or an alkyl metal alkoxide such as diethyl aluminum ethoxide, may also be employed. These organometallic compounds may be used alone or in combination as a mixture of two or more of them.

As the electron-donative compound for component (C), organic esters, oxygen-containing organic compounds of silicon and nitrogen-containing organic compounds are preferred.

As the organic esters, the same compounds as the reactant (iii) to be used for the preparation of the solid catalyst component (A) may be mentioned. Among them, preferred are aliphatic carboxylic esters and aromatic carboxylic esters.

Specifically, the aliphatic carboxylic esters include, for example, ethyl acetate, propyl acetate, butyl acetate, methyl propionate, ethyl propionate and ethyl butylate, having from 2 to 18 carbon atoms. The aromatic carboxylic esters include, for example, methyl benzoate, ethyl benzoate, methyl p-toluate, ethyl p-toluate, methyl anisate and ethyl anisate, having from 8 to 24 carbon atoms. Such organic esters may be used alone, or two or more of them may be mixed or reacted for use.

As the oxygen-containing organic compounds of silicon, the same compounds as the reactant (i-3) may be mentioned. Such oxygen-containing organic compounds of silicon may be used alone, or two ore more of them may be mixed or reacted for use.

As the nitrogen-containing organic compounds, compounds having nitrogen atoms in the molecules and having functions as Lewis bases may be mentioned.

Specifically, they include, for example, amide compounds such as acetic N,N-diemthylamide, benzoic N,N-dimethylamide and toluic N,N-diemthylamide, piperidine compounds such as 2,2,6,6-tetramethylpiperidine, 2,6-diisopropylpiperidine, 2,6-diisobutylpiperidine, 2,6-diisobutyl-4-methylpiperidine, 2,2,6-trimethylpiperidine, 2,2,6,6-tetraethylpiperidine, 1,2,2,6,6-pentamethylpiperidine, 2,2,6,6-tetramethyl-4-piperidylbenzoate and bis(2,2,6,6-tetramethyl-4-piperidyl)sebacate, pyridine compounds such as 2,6-diisopropylpyridine, 2,6-diisobutylpyridine and 2-isopropyl-6-methylpyridine, pyrrolidine compounds such as 2,2,5,5-tetramethylpyrrolidine, 2,5-diisopropylpyrrolidine, 2,2,5-trimethylpyrrolidine, 1,2,2,5,5-pentamethylpyrrolidine and 2,5-diisobutylpyrrolidine, amine compounds such as trimethylamine, triethylamine, tributylamine, tribenzylamine, tetramethylethylenediamine, diisopropylethylamine, tert-butyldimethylamine, diphenylamine and di-o-tolylamine, and aniline compounds such as N,N-diethylaniline and N,N-diisopropylaniline. Such nitrogen-containing organic compounds may be used alone or two or more of them may be mixed or reacted for use.

These electron-donative compounds may be used in combination.

The solid catalyst component (A) is used preferably in an amount corresponding to from 0.001 to 2.5 mmol of titanium atom per liter of the reactor. The organometallic compound (B) is used usually at a concentration of from 0.02 to 50 mmol, preferably from 0.2 to 5 mmol, per liter of the reactor. The electrondonative compound (C) is used usually at a concentration of from 0.001 to 50 mmol, preferably from 0.01 to 5 mmol, per liter of the reactor.

There is no particular restriction as to the manner of introducing the three components in the present invention. For examples, it is possible to employ a method wherein the components (A), (B) and (C) are separately introduced into the polymerization reactor, or a method wherein the components (A) and (B) are contacted, and then the component (C) is contacted thereto for polymerization, or a method wherein the components (B) and (C) are contacted, and then the component (A) is contacted thereto for polymerization, or a method wherein the components (A), (B) and (C) are preliminarily contacted, followed by polymerization.

The polymerization of an olefin is conducted at a reaction temperature lower than the melting point of the polymer in a gas phase or in a liquid phase. When the polymerization is conducted in a liquid phase, an inert solvent may be used as the reaction medium, although the olefin itself may be used as the reaction medium. As such an inert solvent, any solvent which is commonly employed in this technical field may be employed. Particularly preferred is an alkane or a cycloalkane having from 4 to 20 carbon atoms, such as isobutane, pentane, hexane or cyclohexane.

As the olefin to be polymerized in the method for producing a stereospecific polyolefin according to the present invention, an $\alpha$-olefin of the formula $R^5—CH=CH_2$ wherein $R^5$ is a linear or branched substituted or unsubstitued alkyl group having from 1 to 10, particularly from 1 to 8, carbon atoms, may be mentioned. Specifically, propylene, 1-butene, 1-pentene, 4-methyl-1-pentene or 1-octene, may be mentioned. These olefins may be subjected to not only homopolymerization, but also to random copolymerization or block copolymerization. For the copolymerization, such an $\alpha$-olefin and ethylene, or two or more of such $\alpha$-olefins, or such an $\alpha$-olefin and a diene such as butadiene or isoprene, may be used for polymerization. It is particularly preferred to conduct the polymerization by using propylene, propylene and ethylene, propylene and the above-mentioned $\alpha$-olefin other than propylene, or propylene and a diene.

There is no particular restriction as to the reaction conditions for polymerization, so long as the polymerization is conducted at a reaction temperature lower than the melting point of the polymer. However, a reaction temperature of from 20° to 100° C. and a pressure of from 2 to 50 kg/cm² G are usually selected.

The reactor to be used for the polymerization step may be any reactor which is commonly used in this particular field. Namely, the polymerization operation may be conducted in a continuous system, in a semi-batch system or in a batch system using a stirring tank type reactor, a fluidized bed reactor or a circulation type reactor. Further, it is also possible to conduct the polymerization in a plurality of steps under different polymerization reaction conditions.

The first effect is that the amount of the titanium halide compound to be used, can be reduced. Accordingly, the amount of the resulting waste liquid can be reduced. Thus, the method of the present invention is economically advantageous.

The second effect is that it is thereby possible to obtain stereospecific polymer particles having excellent powder properties with little fine particles. This is particularly effective when applied to a gas phase polymerization. Further, it is also possible to obtain polymer particles having a very narrow particle size distribution. Accordingly, in the polymerization step, formation of a deposition within the polymerization reactor can be prevented. Particularly in a slurry polymerization, the separation and filtration of the polymer slurry in the separation and drying steps of the polymer can be facilitated, scattering of fine particles of the polymer out of the system can be prevented, and the drying efficiency will be improved due to the improvement in the flowability. Further, in the transfer step, no bridging will form in the silo, and there will be no trouble in the transfer.

The third effect is such that the polymerization activities are very high, and it is possible to obtain a polymer which does not require a deashing step intended to remove the catalyst residue. By virtue of the high activities, the product will be free from odor or coloring, and no purification of the polymer will be required, such being economically very advantageous.

The fourth effect is such that the stereospecificity of the polymer is excellent. Accordingly, the method is very advantageous for the production of a polymer by a gas phase polymerization method using no reaction medium.

Now, the present invention will be described in further detail with reference to Examples. However, it should be understood that the present invention is by no means restricted by such specific Examples.

In the Examples and Comparative Examples, the melt flow rate (hereinafter referred to simply as MFR) was measured in accordance with JIS K-7210 Condition 14.

The xylene-soluble content (hereinafter referred to simply as $X_Y$) as the index for the stereospecificity, was measured as follows. Firstly, 4 g of the polymer was dissolved in 200 ml of xylene, and then left to stand for one hour in a homoiothermal bath at 25° C. The precipitates were filtered off, and the filtrate was recovered. Xylene was evaporated almost completely, followed by vacuum drying to recover the xylene soluble content, which was represented by a percentage to the initial sample.

The catalytic activities are represented by the amount (g) of the polymer formed per g of the solid catalyst component (A).

With respect to the width of the particle size distribution of the polymer particles, the results of the classification of the polymer particles by sieves are plotted on a probability logarithmic paper to find the geometric standard deviation from the approximated straight line in known manner, and the width is expressed in terms of its common logarithm (hereinafter referred tg as $\sigma$).

The average particle size is a value obtained by reading the particle size corresponding to the weight accumulated value 50% of the above approximated line.

The content of fine particles is the proportion of fine particles having a particle size of 105 μm or less as represented by weight %.

EXAMPLE 1

(a) Preparation of solid catalyst component (A)

Into a 3 l flask equipped with a stirrer, 15 g (0.62 mol) of metal magnesium powder was charged, and then 0.75 g of iodine, 402 g (3.1 mol) of 2-ethylhexanol, 211 g (0.62 mol) of titanium tetra-n-butoxide and 61.2 g (0.22 mol) of diisobutyl phthalate were added thereto. The mixture was heated to 90° C. and stirred for one hour under sealing with nitrogen. The temperature was further raised to 140° C., and the reaction was conducted for two hours to obtain a homogeneous solution containing magnesium and titanium (Mg—Ti solution).

Into a flask having an internal capacity of 500 ml, the Mg—Ti solution was charged in an amount of 0.066 mol in terms of Mg and cooled to 0° C. Then, a solution prepared by diluting 20.5 g (0.13 mol) of isobutylaluminum dichloride with 157 ml of hexane, was added thereto over a period of two hours. After adding all the amount, the temperature was raised to 70° C. over a period of two hours, whereupon a slurry containing a white solid product, was obtained. The solid product was separated by filtration and washed with hexane.

Into a 1 l glass electromagnetic stirring type autoclave, the slurry containing the white solid product thus obtained, was charged, then, a solution prepared by diluting 125 g (0.66 mol) of titanium tetrachloride with 125 g of chlorobenzene, was added in its entire amount. Then, the temperature was raised to 60° C., and 9.0 g of propylene was supplied over a period of one hour. Then, 7.3 g (0.026 mol) of diisobutyl phthalate was added thereto. The mixture was reacted at 100° C. for 3 hours. The product was subjected to filtration to collect the solid portion. Hexane was added to the product, and washing was conducted thoroughly until any freed titanium compound was no longer detected, to obtain a slurry of solid catalyst component (A) suspended in hexane. The supernatant was removed and the rest was dried under a nitrogen atmosphere and subjected to elemental analysis, whereby Ti was 3.5% by weight.

(b) Polymerization of propylene

The internal atmosphere of an electromagnetic stirring type autoclave made of stainless steel having an internal capacity of 5 l was replaced thoroughly with nitrogen, and 1.2 mmol of triethylaluminum as the catalyst component (B), 0.29 mmol of diphenyl dimethoxysilane as the catalyst component (C) and 10 mg of the solid catalyst component (A) were sequentially added thereto. The internal pressure of the autoclave was adjusted to 0.1 kg/cm² G, 0.2 kg/cm² G of hydrogen was added, 2,000 ml of liquefied propylene was added thereto. After initiating the stirring, the temperature was raised to 70° C., and the polymerization was conducted for 90 minutes. After completion of the polymerization reaction, the stirring was stopped and at the same time, unreacted propylene in the system was discharged, and the formed polymer was recovered. As a result, the formed polymer was 266 g, which corresponded to a catalytic activity of 26,600 g/g. Various properties of the polymer particles were measured, whereby MFR was found to be 2.7 g/10 minutes, $X_Y$ was found to be 1.7%, the bulk density was found to be 0.49 g/cm³, the average particle size was found to be 1,620 μm, $\sigma$ was found to be 0.11, and the content of fine particles was found to be 0% by weight. Further, the formed polymer particles were spherical.

EXAMPLE 2

A solid catalyst component was prepared in the same manner as in Example 1 (a) except that the amount of propylene supplied as the above component (v) in Example 1 was changed to 1.8 g. Using the solid catalyst component thus obtained, polymerization of propylene was conducted under the same conditions as in Example 1 (b). As a result, the catalytic activity was found to be 11,000 g/g. Various properties of the polymer particles were measured, whereby MFR was found to be 2.3 g/10 minutes, $X_Y$ was found to be 1.9%, the bulk density was found to be 0.42 g/cm³, the average particle size was found to be 1,990 μm, $\sigma$ was found to be 0.12, and the content of fine particles was found to be 0% by weight.

EXAMPLE 3

A solid catalyst component was prepared in the same manner as in Example 1 (a) except that 9.0 g of ethylene was supplied instead of propylene supplied as the above component (v) in Example 1. Using the solid catalyst component thus obtained, polymerization of propylene was conducted under the same conditions as in Example 1 (b). As a result, the catalytic activity was found to be 22,500 g/g. Various properties of the polymer particles were measured, whereby MFR was found to be 2.2 g/10 minutes, $X_Y$ was found to be 2.4%, the bulk density was found to be 0.49 g/cm³, the average particle size wa found to be 1,890 μm, $\sigma$ was found to be 0.12, and the content of fine particles was found to be 0% by weight.

EXAMPLE 4

A solid catalyst component was prepared in the same manner as in Example 1 (a) except that 9.0 g of 4-methyl-1-pentene was supplied instead of propylene supplied as the above component (v) in Example 1. Using the solid catalyst component thus obtained, polymerization of propylene was conducted under the same conditions as in Example 1 (b). As a result, the catalytic activity was found to be 19,800 g/g. Various properties of the polymer particles were measured, whereby MFR was found to be 3.3 g/10 minutes, $X_Y$ was found to be 2.0%, the bulk density was found to be 0.45 g/cm³, the average particle size was found to be 1,600 μm, $\sigma$ was found to be 0.14, and the content of fine particles was found to be 0% by weight.

EXAMPLE 5

(a) Preparation of solid catalyst component (A)

The solid catalyst component (A) was prepared in the same manner as in Example 1 (a).

(b) Polymerization of propylene

The internal atmosphere of an electromagnetic stirring type reactor made of stainless steel having an internal volume of 1 l was replaced thoroughly with nitrogen, and 5.0 g of a solid catalyst component prepared in the same manner as in Example 1 (a), 300 ml of hexane and 12.5 mmol of triethylaluminum, were sequentially added. The internal pressure of the autoclave was adjusted to 0.1 kg/cm² G, and the internal temperature was adjusted to 20° C. Then, stirring was initiated, and 10 g of propylene was supplied in 20 minutes while maintaining the internal temperature at 20° C., and stirring was continued for 30 minutes. A propylene prepolymer of solid catalyst component (A) thus obtained was separated by filtration and thoroughly washed with hexane to obtain a hexane slurry of the propylene prepolymer of solid catalyst component (A). The supernatant was removed and the rest was dried under a nitrogen atmosphere, whereby the yield was 11.5 g. Polymerization of propylene was conducted under the same conditions as in Example 1 (b) using 23 mg of this prepolymer instead of 10 mg of the solid catalyst component (A). As a result, the catalytic activity was found to be 28,500 g/g in terms of the solid catalyst component (A). Various properties of the polymer particles were measured, whereby MFR was found to be 2.0 g/10 minutes, $X_Y$ was found to be 1.8%, the bulk density was found to be 0.43 g/cm³, the average particle size was found to be 1,660 μm, $\sigma$ was found to be 0.11, and the content of fine particles was found to be 0% by weight.

EXAMPLE 6

A hexane slurry of ethylene prepolymer of solid catalyst component (A) was prepared in the same manner as in Example 5 (a) except that when the prepolymer of the solid catalyst component (A) was prepared in Example 5, 10 g of ethylene was supplied instead of propylene. The supernatant was removed and the rest was dried under a nitrogen atmosphere, whereby yield of the prepolymer was 12.5 g. Using 25 mg of the prepolymer thus obtained, polymerization of propylene was conducted under the same conditions as in Example 1 (b). As a result, the catalytic activity was found to be 37,800 g/g. Various properties of the polymer particles were measured, whereby MFR was found to be 1.6 g/10 minutes, $X_Y$ was found to be 1.7%, the bulk density was found to be 0.44 g/cm², the average particle size was found to be 1,820 μm, $\sigma$ was found to be 0.11, and the content of fine particles was found to be 0% by weight.

EXAMPLE 7

A solid catalyst component was prepared in the same manner as in Example 1 (a) except that 253 g (1.24 mol) of diisobutyldimethoxysilane and 190 g (0.93 mol) of aluminum isopropoxide were used as the component (i-3) instead of titanium tetrabutoxide added as the above component (i-2) in Example 1. Using the solid catalyst component thus obtained, polymerization of propylene was conducted under the same condition as in Example 1 (b). As a result, the catalytic activity was found to be 27,600 g/g. Various properties of the polymer particles were measured, whereby MFR was found to be 3.5 g/10 minutes, $X_Y$ was found to be 1.2%, the bulk density was found to be 0.45 g/cm³, the average particle size was found to be 1,650 μm, $\sigma$ was found to be 0.12, and the content of fine particles was found to be 0% by weight.

EXAMPLE 8

A solid catalyst component was prepared in the same manner as in Example 1 (a) except that 303 g (1.24 mol) of diphenyldimethoxysilane and 143 g (0.62 mol) of tributoxy borane were used as the component (i-3) instead of titanium tetrabutoxide added as the above component (i-2) in Example 1. Using the solid catalyst component thus obtained, polymerization of propylene was conducted under the same conditions as in Example 1 (b). As a result, the catalytic activity was found to be 18,300 g/g. Various properties of the polymer particles were measured, whereby MFR was found to be 2.8 g/10 minutes, $X_Y$ was found to be 1.8%, the bulk density was found to be 0.44 g/cm³, the average particle size was found to be 1,250 μm, $\sigma$ was found to be 0.13, and the content of fine particles was found to be 0% by weight.

COMPARATIVE EXAMPLE 1

A solid catalyst component was prepared in the same manner as in Example 1 (a) except that propylene added as the above component (v) in Example 1, was not added. Using the solid catalyst component thus obtained, polymerization of propylene was conducted under the same conditions as in Example 1 (b). As a result, the catalytic activity was found to be 7,400 g/g. Various properties of the polymer particles were measured, whereby MFR was found to be 2.5 g/10 minutes, $X_Y$ was found to be 2.3%, the bulk density was found to be 0.48 g/cm³, the average particle size was found to be 1,490 μm, $\sigma$ was found to be 0.13, and the content of fine particles was found to be 0% by weight.

The results of polymerization in Examples 1 to 8 and in Comparative Example 1 are shown in Table 1.

TABLE 1

|  | Catalitic activity (g/g cata.) | MFR (g/10 min.) | $X_Y$ (%) | Bulk density (g/cm³) | Average particle size (μm) | $\sigma$ | Content of fine particles (%) |
| --- | --- | --- | --- | --- | --- | --- | --- |
| Example 1 | 26600 | 2.7 | 1.7 | 0.49 | 1620 | 0.11 | 0 |
| Example 2 | 11000 | 2.3 | 1.9 | 0.42 | 1990 | 0.12 | 0 |
| Example 3 | 22500 | 2.2 | 2.4 | 0.49 | 1890 | 0.12 | 0 |
| Example 4 | 19800 | 3.3 | 2.0 | 0.45 | 1600 | 0.14 | 0 |
| Example 5 | 28500 | 2.0 | 1.8 | 0.43 | 1660 | 0.11 | 0 |
| Example 6 | 37800 | 1.6 | 1.7 | 0.44 | 1820 | 0.11 | 0 |
| Example 7 | 27600 | 3.5 | 1.2 | 0.45 | 1650 | 0.12 | 0 |
| Example 8 | 18300 | 2.8 | 1.8 | 0.44 | 1250 | 0.13 | 0 |
| Comparative Example 1 | 7400 | 2.5 | 2.3 | 0.48 | 1490 | 0.13 | 0 |

We claim:
1. A method for producing a stereospecific polyolefin which comprises polymerizing at least one olefin in the presence of a catalyst system comprising a transition metal compound and an organometallic compound, wherein a catalyst system is used which comprises:
(A) a previously prepared solid catalyst component prepared by reacting a homogeneous solution (i) containing
(i-1) magnesium and a hydroxylated organic compound,
(i-2) an oxygen-containing organic compound of titanium and/or

(i-3) an oxygen-containing organic compound of silicon and an oxygen-containing organic compound of aluminum and/or a boron compound, with (ii) at least one aluminum halide compound so that the ratio of the magnesium atom in (i) to the aluminum atom in (ii) is in the range of 1:0.1 to 1:100 to obtain a first solid product, and further reacting to this first solid product in the concurrent presence of (iii) an electron-donative compound, so that the mol ratio of the magnesium atom in (i) to compound (iii) is 1:0.05 to 1:5.0, (iv) a titanium halide compound so that the mol ratio of the magnesium atom in (i) to the component (iv) is in the range of 1:1 to 1:100 and (v) ethylene and/or an α-olefin having at least 3 carbon atoms in an amount so that the molar ratio of magnesium atom in reactant (i) to reactant (v) is 1:0.1 to 1:10, to obtain a second solid product as a reaction product, removing unreacted substances and by-products from the second solid product and washing it with an insert organic solvent until any freed titanium compound is no longer detected to obtain the component (A), (B) at least one member selected from the group consisting of organometallic compounds of Groups IA, IIA, IIB, IIIB, and IVB of the Periodic Table, and (C) an electron-donative compound.

2. The method according to claim 1, wherein the hydroxylated organic compound is an alcohol, a phenol or an organic silanol.

3. The method according to claim 1, wherein the oxygen-containing organic compound of titanium for the reactant (i-2) is a compound of the formula $[O_pTi_u(OR^1)_q]_n$ wherein $R^1$ is a hydrocarbon group having from 1 to 20 carbon atoms, p, q and u are numbers satisfying $p \geq 0$, $q > 0$ and $u \geq 1$, and they are agreeable with the valence of Ti, and n is an integer.

4. The method according to claim 1, wherein the oxygen-containing organic compounds of silicon for the reactant (i-3) is a compound of the formula $R^5_sSi(OR^6)_tX_{4-(s+t)}$ wherein each of $R^5$ and $R^6$ is a hydrocarbon group having from 1 to 20, s and t represent numbers satisfying $0 \leq s \leq 3$, $1 \leq t \leq 4$ and $1 \leq s+t \leq 4$, and X is a halogen atom, the oxygen-containing organic compound of aluminum for the reactant (i-3) is a compound of the formula $Al(OR^2)_mX_{3-m}$ wherein $R^2$ is a hydrocarbon group having from 1 to 20 carbon atoms, m is a number of $0 < m \leq 3$, and X is a halogen atom, and the boron compound for the reactant (i-3) is a compound of the formula $R^3_aB(OR^4)_bX_{3-(a+b)}$ wherein each of $R^3$ and $R^4$ is a hydrocarbon group having from 1 to 20, m and n are numbers satisfying $0 \leq a \leq 3$, $0 < b \leq 3$ and $0 \leq a+b \leq 3$, and X is a halogen atom.

5. The method according to claim 1, wherein the aluminum halide compound for the reactant (ii) is a compound of the formula $AlR^7_rX_{3-r}$ wherein $R^7$ is a hydrocarbon group having from 1 to 20 carbon atoms, X is a halogen atom, and r is a number of $0 < r \leq 2$.

6. The method according to claim 1, wherein the reactant (iii) is an ether, an ester, a ketone, a phenol, an amine, an amide, an imine, a nitrile, a phosphine, a phosphite, a stibine, an arsine, a phosphoryl amide or an alcoholate.

7. The method according to claim 1, wherein the reactant (iv) is a compound of the formula $Ti(OR^8)_fX_{4-f}$ wherein $R^8$ is a hydrocarbon group having from 1 to 20 carbon atoms, X is a halogen atom, and f is a number of $0 \leq f < 4$.

8. The method according to claim 1, wherein the reactant (v) is a compound of the formula $R-CH=CH_2$ wherein R is hydrogen or a linear or branched or cyclic, substituted or unsubstituted alkyl group having from 1 to 10 carbon atoms.

9. The method according to claim 1, wherein the catalyst component (B) is selected from the group consisting of a trialkyl aluminum of the formula $AlR^9_3$ wherein $R^9$ is a linear or branched alkyl group having from 1 to 10 carbon atoms, $C_1$-$C_{20}$ alkyl metal halides and $C_1$-$C_{20}$ alkyl metal alkoxides.

10. The method according to claim 1, wherein the electron-donative compound (C) is an organic ester, an oxygen-containing organic compound of silicon, or a nitrogen-containing organic compound.

11. The method according to claim 1, wherein the reaction with the reactant (iv) is conducted in a divided fashion in multi stages.

12. The method according to claim 1, wherein prior to the main polymerization, a small amount of an organometallic compound component may be added and it is polymerized with a small amount of an α-olefin and/or ethylene of the formula $R-CH=CH_2$ wherein R is a linear or branched or cyclic substituted or unsubstituted alkyl group having from 1 to 10 carbon atoms, or a hydrogen atom, so that it is used in a preliminarily polymerized form.

13. The method according to claim 1 wherein an electron donative compound is present in the homogeneous solution (i).

* * * * *